United States Patent [19]
Houg

[11] Patent Number: 6,029,253
[45] Date of Patent: Feb. 22, 2000

[54] METHOD FOR SYNCHRONIZING DATA WITH A BI-DIRECTIONAL BUFFER

[75] Inventor: Todd C. Houg, St. Francis, Minn.

[73] Assignee: Micron Electronics, Inc., Nampa, Id.

[21] Appl. No.: 08/960,776

[22] Filed: Oct. 30, 1997

[51] Int. Cl.[7] .................................................. G06F 1/12
[52] U.S. Cl. .......................................... 713/600; 710/129
[58] Field of Search ...................... 713/400, 500, 713/600, 401; 395/551, 552, 555, 559; 710/126, 127, 129

[56] References Cited

U.S. PATENT DOCUMENTS

| | | |
|---|---|---|
| 4,642,794 | 2/1987 | Lavelle et al. . |
| 4,816,992 | 3/1989 | Matsumoto . |
| 4,825,098 | 4/1989 | Aoyama . |
| 4,833,655 | 5/1989 | Wolf et al. . |
| 5,079,693 | 1/1992 | Miller . |
| 5,255,239 | 10/1993 | Taborn et al. . |
| 5,295,246 | 3/1994 | Bischoff et al. . |
| 5,325,510 | 6/1994 | Frazier . |
| 5,349,683 | 9/1994 | Wu et al. . |
| 5,448,558 | 9/1995 | Gildea et al. . |
| 5,454,085 | 9/1995 | Gajjar et al. . |
| 5,471,488 | 11/1995 | Bender . |
| 5,557,750 | 9/1996 | Moore et al. . |
| 5,561,779 | 10/1996 | Jackson et al. . |
| 5,781,918 | 7/1998 | Lieberman et al. ......................... 711/5 |

FOREIGN PATENT DOCUMENTS

| | | |
|---|---|---|
| 1-119823 | 5/1989 | Japan . |
| 2-152088 | 6/1990 | Japan . |
| 2-207321 | 8/1990 | Japan . |
| 6-266605 | 9/1994 | Japan . |
| 7-225712 | 8/1995 | Japan . |

*Primary Examiner*—Dennis M. Butler
*Attorney, Agent, or Firm*—Knobbe, Martens, Olson & Bear, LLP

[57] ABSTRACT

A bi-directional buffer circuit for transferring data between clock boundaries in a computer system is described. The circuit is divided into halves, with one half being controlled by a first clock and the second half being controlled by a second clock. The incoming data that is synchronized to the first clock is compiled into data blocks and stored into registers before being synchronized and transferred to the other half of the circuit. The data blocks that are stored in the register sent across a the clock boundary the then synchronized into matched registers within the second half of the circuit. In addition, the signals that control the synchronization of data blocks between the halves of the circuit are synchronized by two stages of registers to avoid the problem of metastability.

11 Claims, 8 Drawing Sheets

METHOD FOR SYNCHRONIZING DATA WITH A BI-DIRECTIONAL BUFFER

BACKGROUND OF THE INVENTION

Related Application

This application is related to U.S. patent application Ser. No.: 08/960,777 entitled "BI-DIRECTIONAL SYNCHRONIZING BUFFER SYSTEM" filed concurrently herewith.

1. Field of the Invention

This invention relates to methods of transferring within a computer system. More specifically, this invention relates to methods of synchronizing data from a component in a first clock domain to a component in a second clock domain with a bi-directional synchronizing buffer.

2. Description of the Related Art

Within most computer systems are sets of buffers that temporarily store data as it is transferred from one component in the computer system to another. These buffers act as temporary storage areas for the data as it moves via various buses in the computer system. One type of buffer, a first in-first out (FIFO) buffer, has been used within computer systems to synchronize data transfers from one clock domain to another in the computer system. As is known, internal components of a computer system can be run at different clock frequencies. Thus, in some cases, data must be sent from a component under the control of one clock to a component that is controlled by a second clock.

For example, a high speed microprocessor may send data to a peripheral device that resides on the expansion bus of the computer system. The microprocessor might, for example, be under the control of a 200 MHz clock, while the peripheral device is running under the control of a 66 MHz clock. Thus, prior systems have placed a data buffer at the boundary between the two clock domains so that data from the microprocessor that is running at 200 MHz does not have to wait through numerous clock cycles to synchronize with the clock frequency of the peripheral device. In some current computer systems, one or more FIFO buffers are placed within a bridge circuit that lies between the microprocessor's clock domain and the peripheral device's clock domain. Data that is sent from the microprocessor at 200 MHz is temporarily stored in a FIFO buffer in the bridge circuit so that the microprocessor can continue to rapidly process data as the slower peripheral device reads data from the FIFO buffer at 66 MHz.

Obviously, at some point, the FIFO buffer will fill with data from the microprocessor and thereby cause the microprocessor to begin inserting wait states into its process until more space becomes available within the FIFO buffer. However, depending on the size of the FIFO buffer, the overall transfer time from the microprocessor to the peripheral device can be substantially reduced. It should also be recognized that data coming from the slower peripheral device can be passed in the reverse direction through a FIFO buffer before being read at high speed by the microprocessor. By using this type of system, the faster microprocessor can wait until the FIFO buffer has filled before starting to read the data at high speed. Thus, the data can be removed from the FIFO buffer at the microprocessor's full speed. However, several problems exist with the current buffer implementations used to increase the speed of transferring data between two clock domains of a computer system.

Some bridge systems, such as the one implemented in the Intel 82430 PCI chipset, include a pair of FIFO buffers to manage data transfers between an Intel Pentium® microprocessor and a Peripheral Component Interface (PCI) peripheral bus of a computer system. In these circuits, one FIFO buffer manages data transfers from the microprocessor to the peripheral bus while the other FIFO buffer manages data transfers in the opposite direction, from the peripheral bus to the microprocessor. While this implementation provides advantages over systems that have no buffering, it also possesses several disadvantages. One disadvantage in this type of system is that implementing two FIFO buffers in opposite orientations requires a large number of silicon gates. The increased gate count leads to a more expensive and less efficient system. Thus, a system that could manage bi-directional data buffering without implementing two separate FIFO buffers would be advantageous.

Another disadvantage of current FIFO buffer systems is that each piece of data is synchronized from one clock domain to another on either the input side or the output side of the FIFO buffer, depending on which component originates the FIFO clock. For example, each piece of data arriving from a high speed component to a FIFO buffer that is synchronized on the input will have to wait through several clock cycles before it is synchronized to the slower clock frequency and stored into the buffer. Alternatively, each piece of data that is sent out of a FIFO buffer that is synchronized on the output to a slower speed component will have to wait through several wait states until it is synchronized to a clock cycle on the slower component. Each of these schemes results in a data transmission delay through the FIFO buffer. Thus, there is a significant penalty imposed in these systems for individually synchronizing each piece of data on the input or output of the FIFO buffer. For this reason, current FIFO buffers do not process data efficiently. It would be advantageous to provide a system that did not require each piece of data to be individually synchronized.

In addition to the disadvantages in prior systems associated with synchronizing every piece of data individually, several other problems exist in prior systems relating to the metastability of logic gates when data is transferred between two clock domains of an integrated circuit.

Synchronization Issues

A synchronization problem exists when passing synchronous logic signals between two separate clock domains within an integrated circuit. The problem is due to a behavior of synchronous logic gates called metastability. When Application Specific Integrated Circuit (ASIC) vendors specify signal timing requirements through their logic gates, it is based on an input data signal (D input of the gate) meeting a specific setup and hold time relative to the clock edge that causes the gate to transition, and guarantee the output (Q output of the gate) to be stable within a specified period of time (output delay). If the input signal does not meet the setup and hold times specified (i.e. the signal transitions close to the clock edge), it may cause the gate to become metastable.

When a gate becomes metastable, its output oscillates rapidly between one and zero, eventually settling to a stable state. However, the logic level that the gate settles to is indeterminate and it may take significantly longer than the normally specified output delay. Obviously, a system cannot depend on the output of a gate that has become metastable because the output logic level does not correspond to the input logic level. For this reason, when an asynchronous logic signal is to be used in a synchronous manner, there is no simple way to guarantee that the signal will meet the gate setup and hold times; thus allowing the gate to go metastable. For this reason current industry practice, when synchronizing logic signals, includes passing the signal through two gates connected in series. This scheme allows the first gate to become metastable and settle out before reaching the second gate at the next clock edge. This allows the output of the second gate to have a clean transition which meets specified output delay times.

Synchronization of multiple data bits

However, several disadvantages exist in the current technology relating to passing a number of asynchronous logic signals (i.e. a data bus) through two gates to provide a stable system in a synchronous environment. One disadvantage is that providing two gates for every signal that crosses the clock boundary increases the number of silicon gates required in the device. This takes gates away from other devices and increases the manufacturing cost of the device.

Another reason for not wanting to place dual gates on every data line that crosses a clock boundary is that, as the device becomes metastable, the output logic level is indeterminate. Thus, the data value output from the second set of gates is indeterminate. Since the data being passed across the clock boundary must be sent without errors, it is unacceptable for the data level of those bits to be indeterminate. Having indeterminate data levels of bits on a data bus would lead to tremendous data errors in the information that is passed through the FIFO buffer.

What is needed in the technology is an efficient system for buffering data between two clock boundaries wherein the system does not require two gates for every data line. In addition, the technology could benefit from a system that provides these advantages and can buffer data in both directions without relying on separate registers to store the data traveling in each direction.

SUMMARY OF THE INVENTION

The present invention is a bi-directional synchronizing buffer which synchronizes data flow between two components in a computer system. As used herein, a component may be any circuit or device within a computer system. In addition, the bi-directional synchronizing buffer provides a full depth buffer which allows the direction of data flow between the components to be reversed. Some of these advantages are accomplished because the buffer can accept a continuous stream of data from a source agent, assemble the data into units, and then synchronize these units across a clock boundary for consumption by a destination agent as a continuous stream of data. The direction of data flow in the bi-directional synchronizing buffer can be reversed allowing either agent to be a source or destination agent.

In one embodiment, the buffer is implemented with two identical halves, each operating from a separate clock synchronous to each one's respective agent. One half of the buffer operates in a write mode while the other half operates in a read mode. When the buffer direction reverses, the read/write mode of each half reverses. The synchronous boundary between each agent's clock domain is at the connection between these two identical halves. From an agent's point of view each half has separate data input and output ports with their respective control signals which operate synchronously with respect to the agent's clock domain.

Each of the buffer halves can be implemented with two or more block multiplexers, wherein the output from each multiplexer is stored as a data unit in a block register. Each half of the buffer also contains a read data multiplexer tree which first multiplexes between the block register outputs, using a block select multiplexer, and then selects each piece of data using a data select multiplexer. This process will be discussed in more detail below.

Direction multiplexers are used to select the direction of data flow through the buffer based on the read/write mode of that buffer half. When the buffer half is in write mode, the direction multiplexer selects the data applied to the data input bus to be written to the appropriate location in the block register. When the buffer half is in read mode, the direction multiplexer selects an entire block of data coming from the block register in the other buffer half. As will be discussed below, each block register has a matching block register in the other buffer half that operates as it's counterpart in the other clock domain.

As discussed in more detail below, an acknowledgment signal is asserted by each buffer half to indicate that the data is synchronized and has been transported across the clock boundary from one buffer half to another. Of course, the acknowledgment signal itself must be synchronized to a different clock by the originator of the data. The originator is then allowed to change the data, and signal new data with a synchronization flag. The inherent problem in this type of system is that the synchronization signal must pass through two gates in the destination clock domain before the acknowledge signal is returned. In addition, the return acknowledge signal must pass through two gates in the originator's clock domain before the data can be changed. If the data was synchronized individually as in prior systems, it would be delayed at rate about one fourth of the clock rate if the two clocks are close to the same frequency.

To overcome this disadvantage, the bi-directional synchronizing buffer processes data by first assembling the data into data units of multiple words and then synchronizes the units all at once. The size of the blocks of data can vary depending on the requirements and relative clock rates of the source and target devices. By synchronizing data across the clock boundary a unit at a time instead of a word at a time, the synchronization delays are reduced by a factor of the unit size. However, if only a single unit of registers are available, the data flow must be stalled during the synchronization period when the data is not allowed to change. A solution to this involves the use of two or more data block registers so that data may be assembled in one register while another unit of data is being synchronized. This approach allows data to flow across a synchronous boundary at a rate equal to that of the slowest clock.

One embodiment is a method for buffering data transfers in a computer system from a first clock domain to a second clock domain. The method includes the acts of: converting a plurality of data bits from a first component into a unit of data, the first component being under the control of a first clock; storing the unit of data in a first storage component, wherein the first storage component is under the control of the first clock; transferring the unit of data from the first storage component to a second storage component in response to a signal; and converting the unit of data into a plurality of data bits.

Yet another embodiment is a method for transferring data in a computer system from a first clock domain to a second clock domain. The method includes the acts of: multiplexing a plurality of data bits from a first component into data blocks, the first component being under the control of a first clock; storing the data blocks to a first block register, wherein the first block register is under the control of the first clock; transferring the data blocks from the first block register to a second block register, wherein the second block register is under the control of a second clock; and demultiplexing the data blocks into a plurality of data bits.

One additional embodiment is a method of transferring data in a computer from a first component to a second component. The method comprises the acts of: requesting data to be transferred from a first component to a second component; writing data from the first component to a first block register in a first clock domain; determining whether the first block register is full; transferring the data from the first block register to a second block register in a second clock domain when the first block register is full; and sending the data from the second block register to the second component.

DETAILED DESCRIPTION

This invention relates to a bi-directional synchronizing buffer within a computer system for increasing the speed of data transfers between computer devices in separate clock domains. In one embodiment, the bi-directional synchronizing buffer is a bi-directional FIFO buffer that comprises a common set of data registers for managing data flowing in either direction. These registers act as temporary storage components for the buffer. An embodiment of the invention also includes a series of multiplexers located within the buffer for building units of data from the individual bytes of data that flow into the buffer. Because the data is first built into data units before crossing the clock boundary, this embodiment is more efficient at transferring data from a source component to a target component. The mechanism for building data units from the individual data bytes will be discussed in more detail below.

Another aspect of the invention relates to the design of the circuitry for controlling data transfers across clock boundaries. To overcome the difficulties associated with signal metastability of data transmissions from one clock boundary to another, embodiments of the invention include synchronization and acknowledgment signals that pass between the two clock domains in the buffer and provide an indication of when the data signals have become stable. Once the data block has become stable, as indicated by the synchronization signal, the data unit is ready for synchronization so it can traverse the clock boundary. In addition, to increase the speed of the data transfer, the circuits responsive to the synchronization and acknowledgment signals are triggered by clock transition events (e.g.: either a rising or falling clock edge). The system does not need to wait for a signal to become either high or low, just to transition from one state to another. By having these signals responsive to clock transitions events, there is no need for the system to wait for a signal to become active, it is only necessary for the system to discern whether the signal has changed states.

Embodiments of the invention can be located within the host bridge circuit of a computer system which manages communication between the processor and the bus. Other embodiments of the buffer could be located between the processor and the memory. The computer system can be based on any modern microprocessor including the Intel® Pentium®, Pentium Pro® or Pentium II®. In addition, the invention is anticipated to function within computer systems based on AMD®, Cyrix®, Motorola® or Digital Equipment Corporation microprocessors.

A host bridge circuit normally manages communication in a computer system between a host processor and peripheral devices. For example, the host bridge circuit might manage communications between an Intel® Pentium® processor and a device attached to the Peripheral Communication Interconnect (PCI) bus of the computer.

Figure 1:
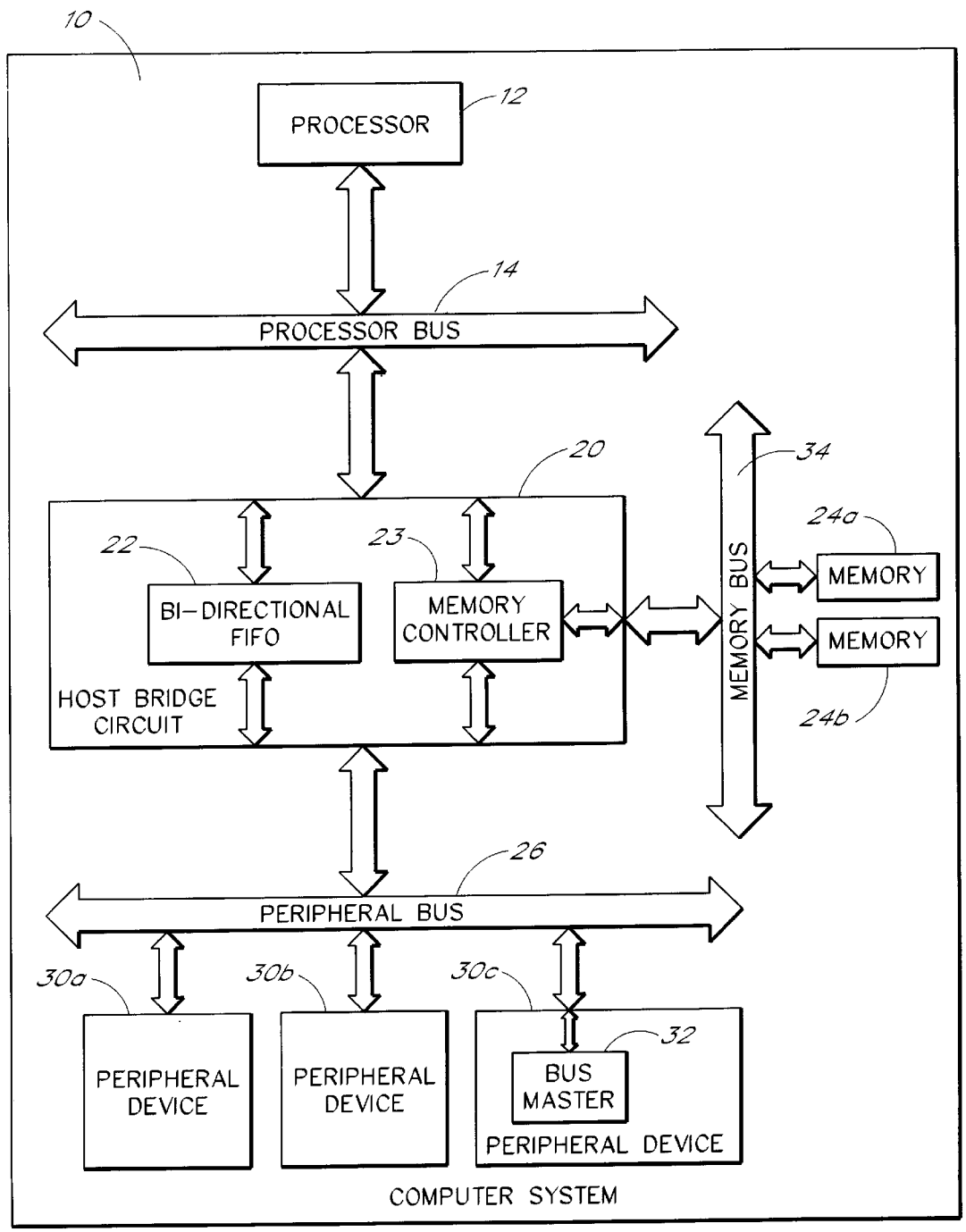
FIG. 1 is a block diagram of a computer system including a bi-directional synchronizing FIFO buffer of the invention in a host bridge circuit.

Referring now to FIG. 1, a computer system 10 is illustrated. The computer system 10 includes a processor 12 in communication with a processor bus 14. As discussed above, the processor 12 can be any type of central processing unit (CPU) known in the art, including an Intel® Pentium®, Intel® Pentium Pro®, Intel® Pentium II®, Digital Equipment Corporation Alpha Processor, Advanced Micro Devices K5, Advanced Micro Devices K6 or other similar processor.

The processor bus 14 communicates instructions and data from the processor 12 to other components within the computer system 10. One of the components in communication with the processor bus 14 is a host bridge circuit 20. The host bridge circuit component is responsible for communicating instructions and data from the processor bus 14 to peripheral devices that are internal and external to the computer system 10. Examples of internal peripheral devices are video graphics controllers, network interface controllers and internal modems. Examples of external peripheral devices are scanners, digitizing tablets and printers. Thus, instruction and data transfers between the processor 12 and peripheral devices are communicated through the host bridge circuit 20.

In the embodiment shown in FIG. 1, the host bridge circuit 20 contains a bi-directional FIFO buffer 22 and a memory controller 23. Details of the bi-directional FIFO buffer 22 will be described in more detail below in relation to FIGS. 3 and 4. However, as illustrated, the bi-directional FIFO buffer 22 is placed within the host bridge circuit 20 to buffer instruction and data requests to and from the processor 12. The memory controller 23 manages memory requests from the processor 12 to memory chips 24a,b.

As illustrated, the bi-directional FIFO buffer 22 is in communication with a peripheral bus 26 that communicates instructions and data to several peripheral devices 30a–c. As shown, one of the peripheral devices 30c may include a bus master 32 which can transfer data to/from the computer system 10 by requesting bus cycles. The host bridge circuit 20 is also in communication with a memory bus 34 which transfers data from/to the peripheral devices 30a–c or processor 12 to/from the computer's memory chips 24a,b (or vice versa). Also, data transfers could occur to/from memory bus 34 or to/from processor bus 14. This is determined by system architecture and is independent of FIFO implementation.

Figure 2:
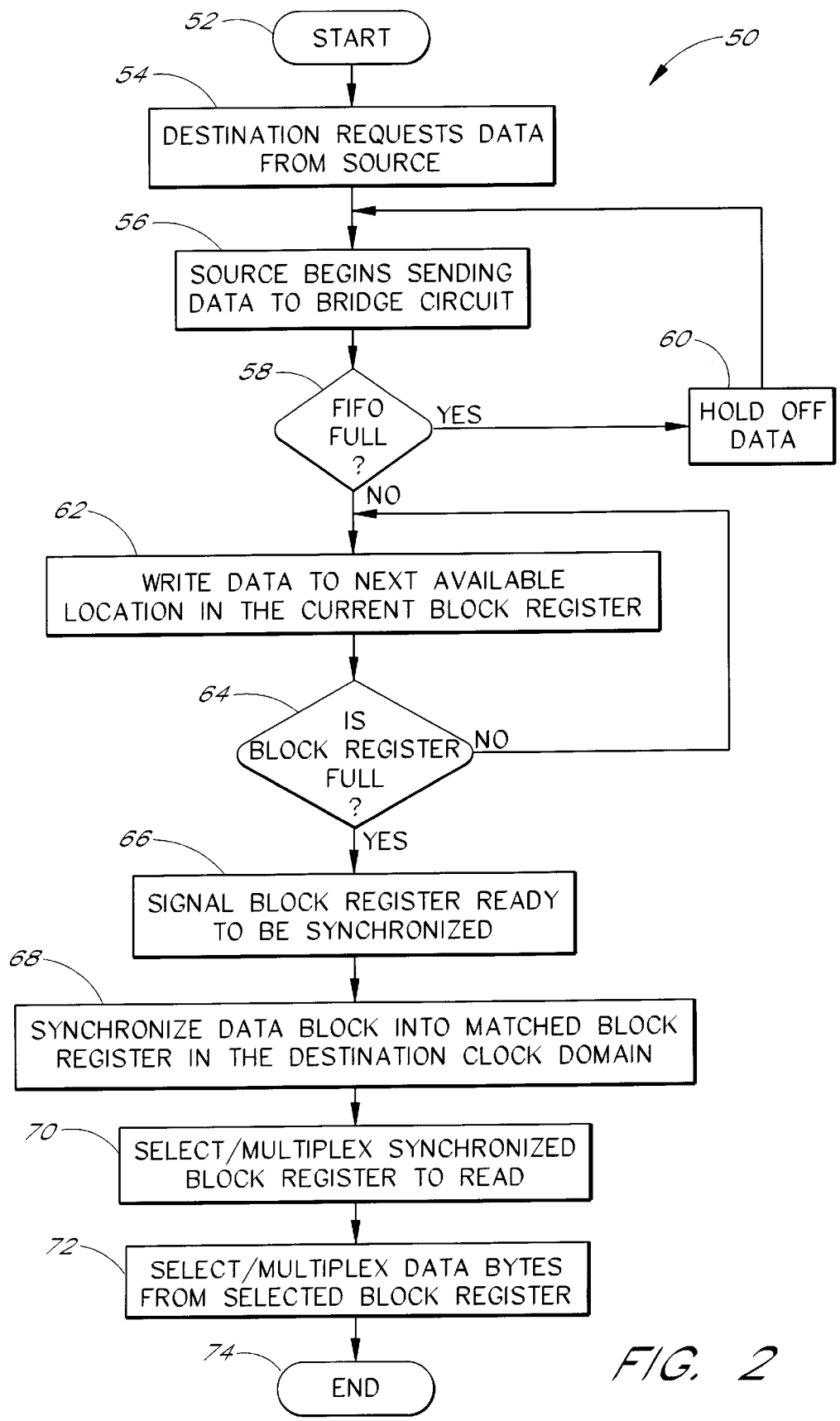
FIG. 2 is flow diagram illustrating the overall process of sending data from a source to a destination through an embodiment of a bi-directional FIFO buffer of the invention.

FIG. 2 is a flow diagram illustrating an overall process 50 occurring within the embodiment of the bi-directional FIFO buffer 22 of FIG. 1. As can be understood upon reference to FIG. 1, the bi-directional FIFO buffer 22 transfers data from the processor bus 14 to the peripheral devices 30a–c, or alternatively from the peripheral devices 30a–c to the processor bus 14. In addition, the bi-directional FIFO buffer 22 can transfer data from the peripheral bus 26 to the memory bus 34 and vice versa. For this reason, the flow diagram of FIG. 2 refers to source and destination components since either the processor 12, memory 24a,b or peripheral device 30 could be a source or destination of the data that flows through the bi-directional FIFO buffer 22. The process 50 of transferring data between a source and destination begins at a start state 52 and moves to state 54 wherein the destination component requests data from the source component. In one embodiment, the destination component might be a peripheral device 30a and the source component might be system memory chip 24a,b. Thus, in this embodiment, a peripheral device makes a data request from the memory. Once a request has been received by the source component, the process 50 moves to a state 56 wherein data is sent from the source component to the host bridge circuit 20. The process 50 then moves to state 58 wherein a determination is made whether the FIFO buffer 22 is full. If a determination is made that the FIFO buffer is full at the decision state 58, the process 50 moves to state 60 wherein the data from the source component is held off from being transmitted. Once the data has been held off from being transmitted at the state 60, the process 50 loops back to the state 56 to once again begin sending data to the host bridge circuit.

If a determination is made at the decision state 50 that the FIFO buffer is not full, the process 50 moves to state 62 wherein data is written to the next available location in the current block register. As will be discussed in more detail below, the data is assembled directly into the current block register. The data travels directly from the data inputs, through a multiplexer to become assembled within the block register. Once data has been written to the next available location in the block register at state 62, the process 50 moves to a decision state 64 wherein a determination is made whether the block register is full. If the block register is not full, the process 50 loops back to state 62 wherein additional data is written to the current block register.

However, if a determination is made at the decision state 64 that the block register is full, the process 50 moves to state 66 wherein a signal is generated from the current block register to indicate that it holds a unit of data that is ready to be synchronized with the opposite half of the FIFO buffer in the destination clock domain.

After the block register has signaled that it has a data unit ready to be synchronized at state 66, the process 50 moves to state 68 wherein the data are synchronized into the matched block register in the destination clock domain. The process 50 then moves to state 70 wherein the destination block register is selected to be read by a select multiplexer. This will be discussed in more detail below in reference to FIG. 3.

The process 50 then moves to state 72 wherein the individual data bytes stored within the block register are selected by a data select multiplexer. Once the data bytes have been selected at the state 72, so that they can be sent out of the FIFO buffer 22, the process ends at an end state 74.

The process 50 described in FIG. 2 is an embodiment of a FIFO buffer wherein data bytes are sent from a source component or device to a destination component or device and wherein the source component is under the control of one clock and the destination component is under the control of a second, different, clock. The bi-directional synchronizing FIFO buffer 22 (FIG. 1) assembles the data stream from the source component into units of data and then transfers those units across the clock boundary that divides the FIFO buffer 22 into separate domains. In practice, each of the clock signals is fed into the host bridge chip 20 so that one half of the FIFO buffer 22 is controlled by a first clock and a second half of the FIFO buffer 22 is controlled by a second clock.

By assembling the data stream from the source component into data units before synchronizing the data into the destination component's clock domain, there are fewer total discreet pieces of data that must transfer across the clock boundary. Thus, the system is more efficient because fewer synchronizations will take place. In addition, fewer clock cycles are required to transfer the same amount of data across the asynchronous clock boundary since more data is transferred with every synchronization. Since fewer pieces of data are transferred using the bi-directional FIFO buffer, fewer clock cycles are needed to move the data from one clock domain to another. This will be explained more fully in regard to FIG. 3.

Figure 3:
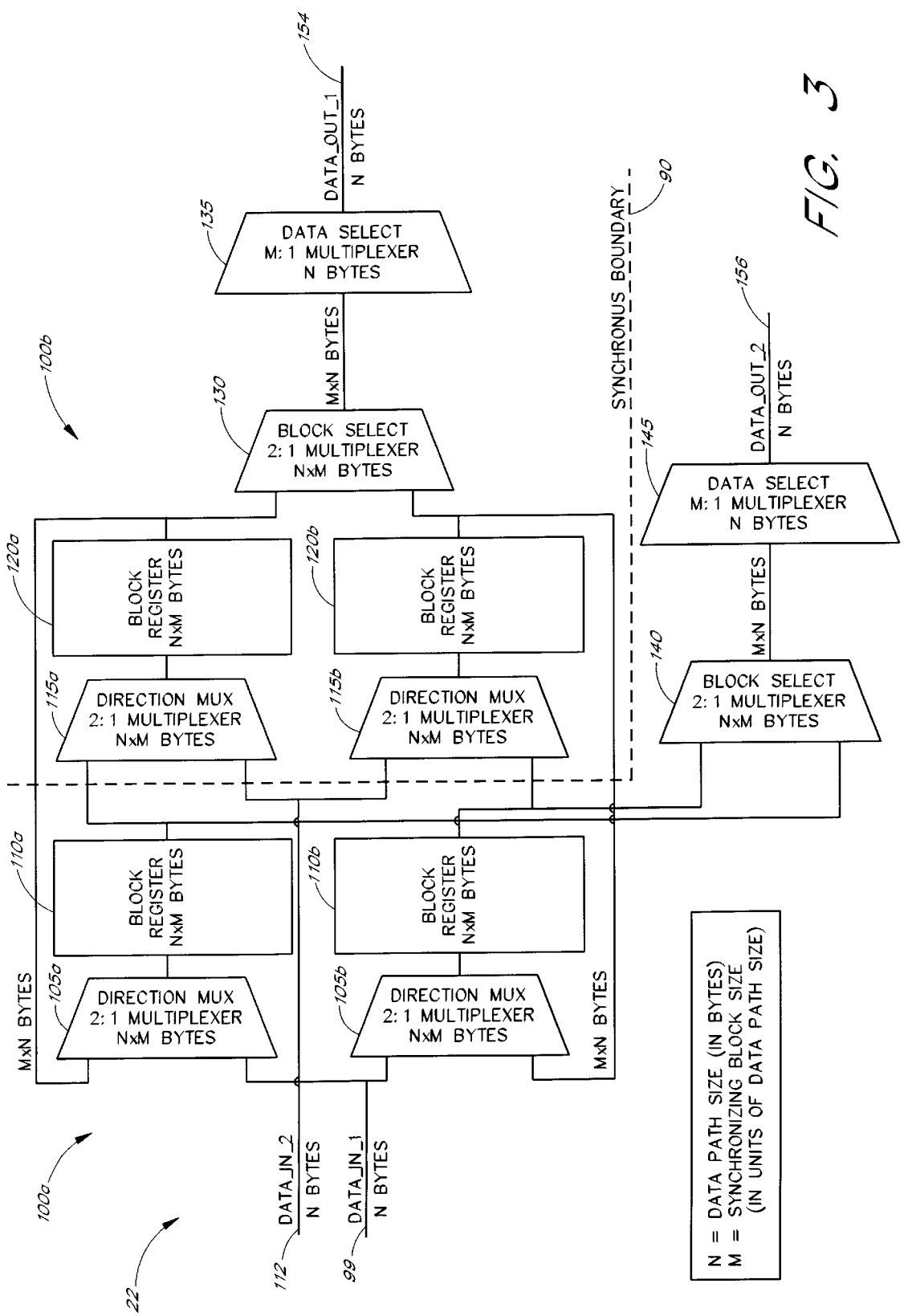
FIG. 3 is a block diagram of the multiplexers and block registers in an embodiment of the bi-directional synchronizing FIFO buffer.

FIG. 3 is a block diagram of an embodiment of a bi-directional FIFO buffer 22 (FIG. 1). As shown, a synchronous boundary 90 divides the bi-directional FIFO buffer 22 into two distinct halves 100a and 100b that are each controlled by their own, different clocks. For example, the components on the left half 100a of the FIFO buffer 22 may be controlled by a 200 MHz processor clock whereas the components on the right half 100b may be controlled by a 33 MHz bus clock. Because the bi-directional FIFO buffer 22 is designed to buffer data transfers from one clock domain to another, the components within each respective half of the FIFO buffer 22 are controlled by separate clocks and data travels from one clock domain to the other.

In the embodiment described in FIG. 3, the left half 100a of the FIFO buffer 22 includes a DATA_IN_1 line 99 in communication with a pair of data multiplexers 105a,b. Each of the multiplexers 105a,b is in communication with a block register 110a,b. The right half 100b of the bi-directional FIFO buffer 22 includes a DATA_IN_2 line 112 in communication with a pair of multiplexers 115a,b and block registers 120a,b. Although this embodiment includes two multiplexers and two block registers in each half of the bi-directional FIFO buffer 22, embodiments with 3, 4, 5 or more multiplexers and registers could be similarly implemented.

A block select multiplexer 130 connects to outputs of the block registers 120a and 120b and selects between the block registers 120a and 120b as inputs. A data select multiplexer 135 communicates with the block select multiplexer 130 so that the data blocks coming from the block select multiplexer 130 are broken down into their original size before being sent to the target device.

A block select multiplexer 140 connects to outputs of the block registers 110a and 110b and selects between the block registers 110a and 110b as inputs. A data select multiplexer 145 communicates with the block select multiplexer 140 and divides the data blocks into their original data configuration.

In use, a set of M data words arrives along either the DATA_IN_1 line 99 or the DATA_IN_2 line 112. Data that arrives along the DATA_IN_1 line 99 sent to either multiplexer 105a or multiplexer 105b. In one embodiment, the bi-directional FIFO buffer 22 maintains a status flag pointing to the next multiplexer to receive data. For example, the first set of M data words arriving along the DATA_IN_1 line 99 might be sent to multiplexer 105a, whereas the next series of M data words sent along the DATA_IN_1 line would be sent to multiplexer 105b. The incoming data is actually made available to each 'M' words of all block registers. There are two sets of pointers that control which word of which block register gets written. The first set of pointers corresponds to the status flag that indicates the current block register to be written. The second set of pointers indicates which of the 'M' words of the current block register is to be written next.

Data words that are sent to multiplexer 105a are multiplexed into data blocks of a predetermined size and then saved into the block register 110a. Once the block register 110a is notified that the block register 120a, on the opposite side of the synchronous boundary 90 is empty, data is transferred from the block register 110a to the block register 120a. The data from the block register 110a passes through the multiplexer 115a without change before being stored in the block register 120a. The control mechanism for synchronizing data blocks across the clock boundary 90 will be discussed more completely in reference to FIG. 4.

The data stored in the block register 120a is then selected by the block select multiplexer 130 which alternates between gathering data from the block register 120a and the block register 120b. Once the block select multiplexer 130 has selected to receive data from the block register 120a, the data is sent to the data select multiplexer 135 which then breaks the data down into words of its original size. For example, in the Intel® architecture: 1 cacheline=4 quadwords; 1 quadword=8 bytes=64 bits; 1 doubleword (dword)=4 bytes=32 bits. For example, the block register 120a may hold one cacheline of four quadwords, totaling 256 bits. The 256 bit block is selected by the block select multiplexer 130 and thereafter the data select demultiplexer 135 breaks the 256 bit unit of data down into its original quadword format. The multiplexed quadwords are then sent out via a DATA_OUT_1 line 154.

As discussed above, data can also flow in the opposite direction, from the right half 100b of the bi-directional synchronizing FIFO buffer 22 to the left half 100a by using the DATA_IN_2 line as the input. For example, a set of data including M words can arrive along the DATA_IN_2 line 112 and be multiplexed into data blocks by the multiplexers 15a–b. In one embodiment, a status flag is set so that the arriving data bytes will be alternately sent to either multiplexer 115a or 115b. If the M data words are sent to multiplexer 115b, then the resulting multiplexed data blocks are stored within the block register 120b. Once the data register 120b is notified that space is available within the block register 110b, on the opposite side of the clock boundary 90, then the data block is sent on the next clock transition from the block register 120b to the multiplexer 105b.

The unit of data is then passed through the multiplexer 105b and stored into the block register 110b. Once the block select multiplexer 140 selects to receive input from the register 110b, the unit of data is sent to the data select multiplexer 145 where it is broken down into the original M word segments. The data words are then sent out via the DATA_OUT_2 line 156.

Thus, data can be input into the left half 100a, along the DATA_IN_1 line 99 and be output from the right half 100b via the DATA_OUT_1 line 154. Similarly, data can be sent in the reverse direction by being input into the right half 100b along the DATA_IN_2 line 112 and come out of the left half via the DATA_OUT_2 line 156. The signals that manage data flow across the synchronous boundary 90 and between the left half 100a and right half 100b of the bi-directional FIFO buffer are described more particularly in FIG. 4.

Figure 4:
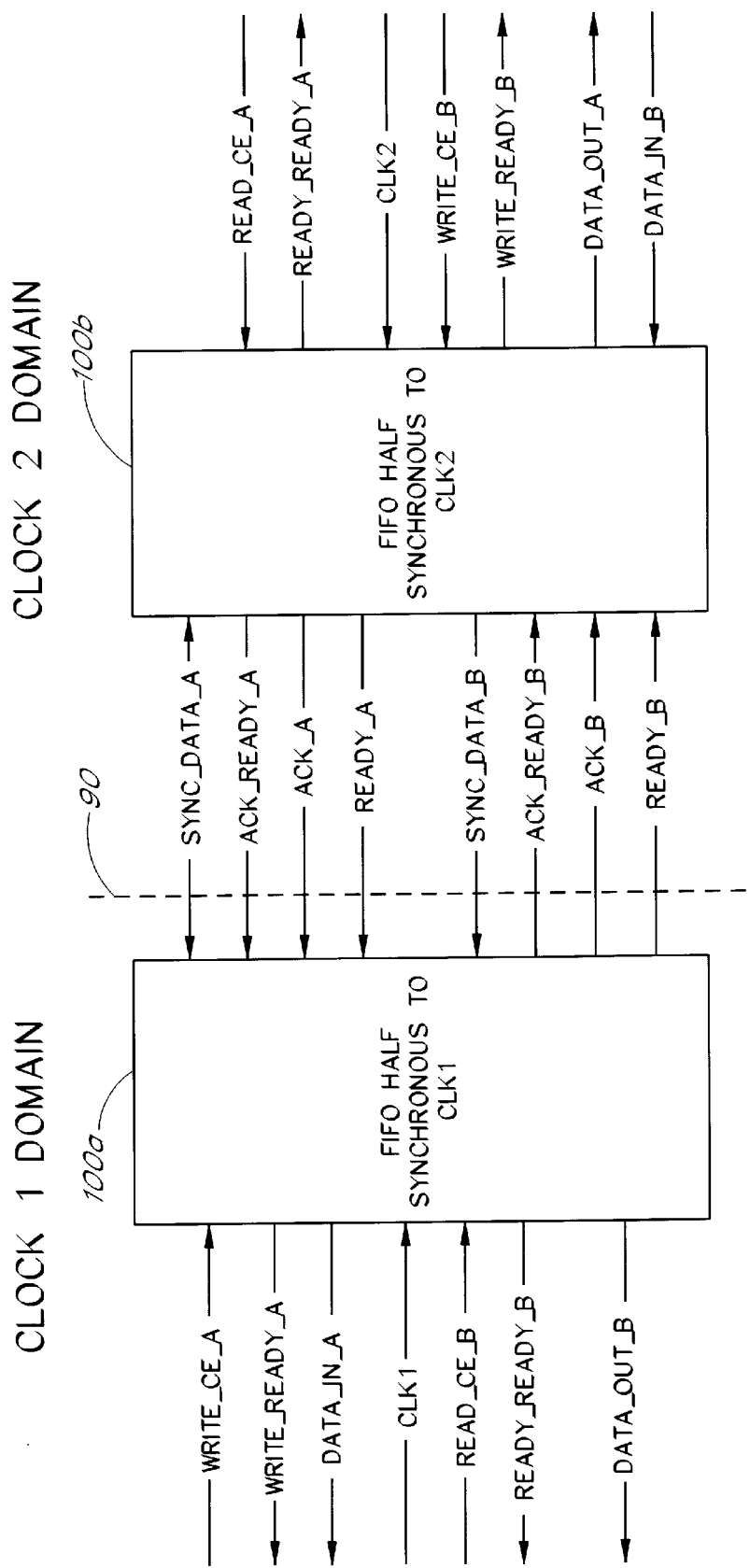
FIG. 4 is a circuit diagram illustrating signals that are passed between the separate halves of an embodiment of a bi-directional synchronizing FIFO buffer.

Referring now to FIG. 4, a set of data signals that communicate between the left half 100a and right half 100b of the bi-directional FIFO buffer is shown. Table 1 below provides a description of each of the signals illustrated in FIG. 4. As described, these signals are transition event signals, not active level signals. Thus, each event is signaled by a logic level transition, either high to low or low to high.

TABLE 1

Bi-directional FIFO buffer Control Signals

| Signal Name | Description |
| --- | --- |
| Synchronizing Control | |
| SYNC_DATA | Indicates that data is available for synchronization. |
| ACK_READY | Indicates that the data has been synchronized and that there is room for additional data. |
| ACK | Indicates that data has been synchronized but there is not presently room for additional data. |
| READY | Indicates that there is now room for additional data. |
| FIFO buffer Interface Control | |
| WRITE_CE | Write clock enable causes data to be written to the FIFO buffer whenever it is active during a rising edge of the clock(CLK). |
| READ_CE | Read clock enable causes data to be removed from the FIFO buffer whenever it is active during a rising edge of the clock(CLK). |
| CLK | The CLK controls the synchronous transfer of data at the FIFO buffer interface. |
| READ_READY | FIFO buffer Status bit that indicates when there is data available to be read from the FIFO buffer. |
| WRITE_READY | FIFO buffer status bit that indicates when there is room in the FIFO buffer for additional data. |

Signals suffixed with an "A" are involved when the FIFO buffer data flow direction is from the first clock (CLK1) domain 100a to second clock (CLK2) domain 100b. Signals suffixed with B are involved when the FIFO buffer data flow direction is from the CLK2 domain 100b to the CLK1 domain 100a.

Figure 5:
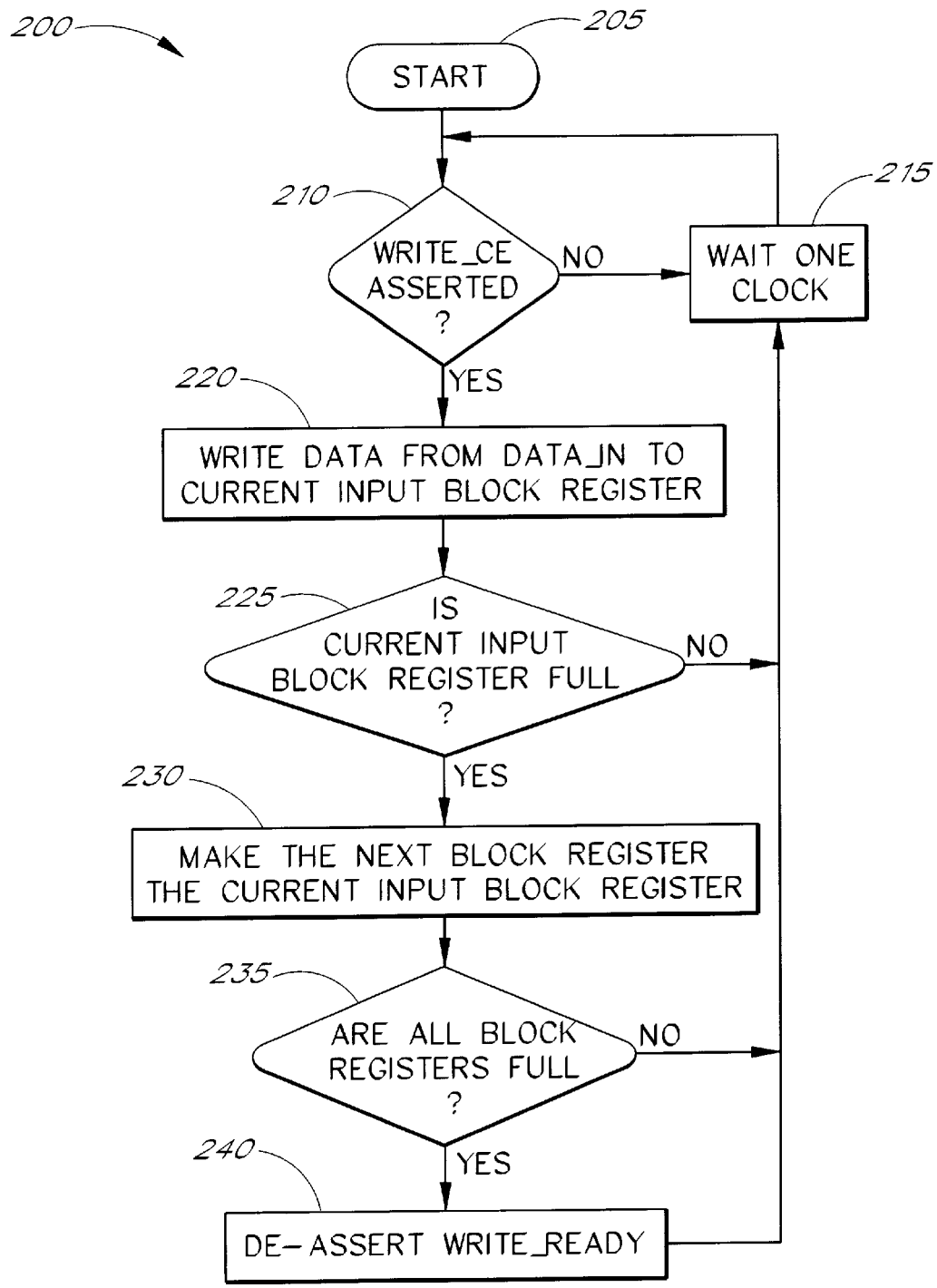
FIG. 5 is a flow diagram illustrating the signal changes that take place as data is written into the current input block register of one embodiment of a bi-directional synchronizing FIFO buffer.

FIG. 5 is a flow diagram illustrating an embodiment of a process by which the signals shown in FIG. 4 function. The flow diagram of FIG. 5 shows a process 200 that the left half 100a of the bi-directional FIFO buffer 22 undergoes to send data to the right half 100b. It should be noted that a similar process can be undertaken by the right half 100b of the bi-directional FIFO buffer 22 to send data to the left half 100a of the bi-directional FIFO buffer 22.

Referring to FIGS. 4 and 5, the process 200 begins at a start state 205 when the computer system 10 (FIG. 1) has data to be sent from a source device to a target device. The source device might be a microprocessor such as a Pentium Pro or Pentium II and the target device, in one embodiment, could be any device linked to the PCI bus of the computer system 10. As discussed above, this type of data is buffered by the bi-directional FIFO buffer 22 as it transitions between the processor clock domain and the bus clock domain.

The process 200 then moves to a decision state 210 wherein a determination is made whether the WRITE_CE clock enable signal has been asserted, indicating that the bi-directional FIFO buffer 22 can accept data into its registers. If a determination is made at the decision state 210 that the WRITE_CE clock enable signal is not asserted, the process 200 moves to state 215 to wait through one clock cycle. The process 200 then loops back to the decision state 210 to determine whether the WRITE_CE clock enable signal has now been asserted.

Once a determination is made at the decision state 210 that the WRITE_CE clock enable signal has been asserted by the left half 100a, the process 210 moves to state 220 wherein data is written from the source device along the DATA_IN line to the current input block register in the left half 100a. The current input block register is determined by a set of pointers that keep track of which block registers within the left half 100a contain data and which are empty. Thus, following the determination at the decision state 210 that the WRITE_CE clock enable has been asserted, the process 200 moves to a decision state 225 wherein a determination is made whether the current input block register is full.

If the current input block register is not full at the decision state 225, the process 200 returns to the state 215 to wait through one clock cycle before attempting to write additional data to the current input block register at state 220. If the current input block register is full at the decision state 225, the process 200 moves to state 230 wherein a pointer is set to indicate the location of the next block register within the left half 100a to receive incoming data. This mechanism thereby allows incoming data to be placed within any of the empty block registers in the left half 100a. Once a pointer is set to indicate the next block register to receive data (eg: the current block register) at the state 230, the process 200 moves to a decision state 235 wherein a determination is made whether all the block registers within the left half 100a are full. If all of the registers are not full at the decision state 235, the process 200 returns to the state 215 to wait through one clock cycle before writing more data to the current block register at state 220.

However, if all of the block registers within the left half 100a are full at the decision state 235, the process 200 moves to state 240 and de-asserts the WRITE_READY signal. By de-asserting the WRITE_READY signal, the bi-directional FIFO buffer 22 indicates to other components communicating with the left half 100a that it can no longer accept any additional data.

Figure 6:
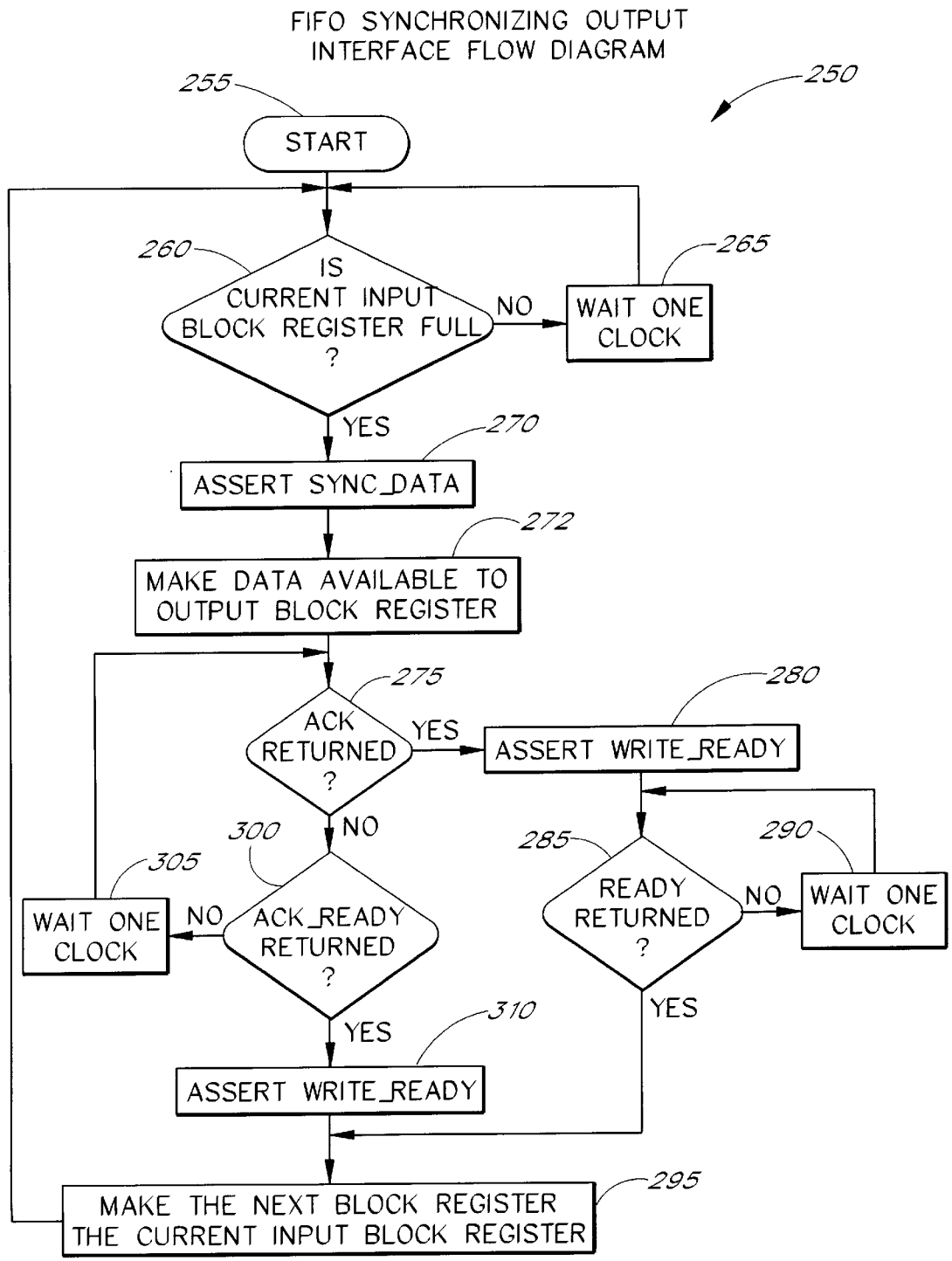
FIG. 6 is a flow diagram illustrating the signal changes that take place as data is written from a block register in one clock domain of an embodiment of a bi-directional synchronizing FIFO buffer to a second clock domain.

FIG. 6 illustrates a process 250 for synchronizing data from an input block register in the left half 100a to an output block register in the right half 100b of the bi-directional FIFO buffer 22. The input block register is the current block register that is to receive the data. The output block register is the current block register that is to send the data out of the FIFO buffer 22. The process 250 begins at a start state 255 and then moves to a decision state 260 wherein a determination is made whether the currently selected input block register in the left half 100a is full. As can be imagined, it is most efficient to transfer an entire unit of data from the left half 100a to the right half 100b. Thus, the process 250 normally waits until the input block register in the left half 100a has filled before signaling the right half 100b. However, it should be understood that other embodiments wherein the right half transfers data before becoming filled are also contemplated. Once the currently selected input block register in the left half 100a has become full, the unit of data within that block register needs to be synchronized across the clock boundary so that it can be sent to the target component. In one embodiment, the input and output block registers can store an entire cache line of data (256 bits). Current implementations of the Intel Pentium, Pentium Pro and Pentium II architecture use 256 bits (i.e.: four quad words) of data as one cache line. Thus, in one implementation, each unit of data that is transferred from the left half 100a to the right half 100b comprises 256 bits.

Referring still to FIG. 6, if the current input block register is not full at the decision state 260, the process 250 moves to state 265 to wait one clock cycle before returning to the decision state 260. Once a determination has been made at the decision state 260 that the current input block register has stored an entire cache line of data, the process 250 moves to state 270 and asserts the SYNC_DATA signal indicating to the right half 100b that a unit of data is ready to be synchronized. The process 250 then moves to a state 272 wherein the unit of data within the current block register is made available to the opposite half of the bi-directional FIFO buffer 22.

Once the unit of data within the current input block register has been made available at the state 272, the process 250 moves to a decision state 275 wherein a determination is made whether the ACK acknowledgment signal has been returned from the opposite portion of the bi-directional FIFO buffer 22 indicating that the data has been synchronized. If an ACK acknowledgment signal has been returned at the decision state 275, the process 250 moves to state 280 wherein a WRITE_READY signal is asserted to indicate that the input block register has sent out its data and can now receive more data.

As described above in reference to Table 1, the WRITE_READY signal is asserted to indicate when there is room in the bi-directional FIFO buffer 22 for additional data. Once the WRITE_READY signal has been asserted at the state 280, the process 250 moves to a decision state 285 wherein a determination is made whether a READY signal has been returned. The READY signal indicates that block register space is available in the right half 100b of the buffer for more synchronized data. If a determination is made at the decision state 285 that the READY signal has not been returned, the process 250 moves to state 290 to wait through one clock cycle before returning to the decision state 285. If a determination is made at the decision state 285 that the READY signal has been returned, the process 250 moves to state 295 wherein a pointer is set to select the next input block register in the left half 100a that has data to be synchronized. This next input block register becomes the "current" input block register. The process 250 then returns to the decision state 260 wherein a determination is made whether the newly selected input block register has a complete unit of data.

If a determination is made at the decision state 275 that the ACK acknowledgment signal has not returned from the right half 100b, the process 250 moves to a decision state 300 to determine whether an ACK_READY signal has been asserted by the right half 100b. As shown in Table 2, the ACK_READY signal is asserted by one half of the buffer to indicate that data has been synchronized across the clock boundary, but there is room for additional data in the other output block register. If the ACK_READY signal has not been returned at the decision state 300, the process 250 moves to state 305 and waits through one clock cycle before returning to the decision state 275. However, if the ACK_READY signal has been returned at the decision state 300, the process 250 moves to state 310 wherein a WRITE_READY signal is asserted by the left half 100a to indicate that more data can be written to the current input block register. Once the WRITE_READY signal has been asserted at the state 310, the process 250 moves to state 295 and sets a pointer selecting the next input block register that is to send data across the synchronous clock boundary to the right half 100b.

Figure 7:
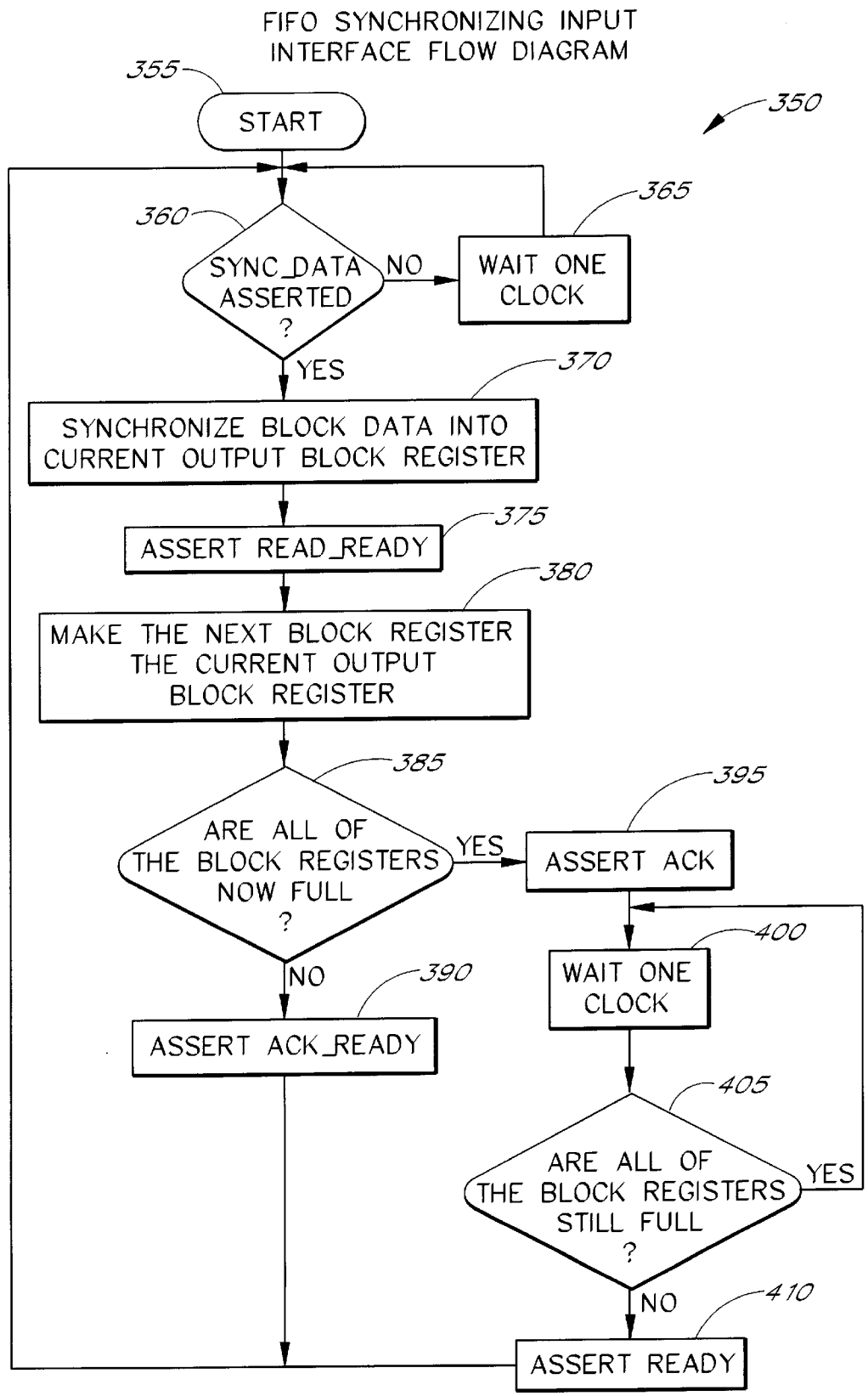
FIG. 7 is a flow diagram illustrating the signal changes that take place as data is read from a block register in one clock domain of an embodiment of a bi-directional synchronizing FIFO buffer to a second clock domain.

Referring now to FIG. 7, a process 350 undertaken by the right half 100b to receive data across the synchronous boundary is shown. The process 350 begins at a start state 355 and moves to a decision state 360 wherein a determination is made whether the left half 100a has asserted a SYNC_DATA signal. As discussed in Table 1, the SYNC_DATA signal indicates that data is waiting to be synchronized from the left half 100a. If the SYNC_DATA signal has not been asserted at the decision state 360, the process 350 moves to a state 365 wherein it waits through one clock cycle before returning to the decision state 360.

Once the SYNC_DATA signal has been asserted at the decision state 360, the process 350 moves to state 370 wherein a unit of data from the left half 100a is synchronized and stored into the current output block register in the right half 100b. The process 350 then moves to state 375 wherein a READ_READY signal is asserted by the right half 100b to indicate to the target component that data is available to be read. The process 350 then moves to a state 380 wherein a pointer is moved to indicate the next block register in the right half 100b to receive data from the input block registers in the left half 100a. The process 350 then moves to a decision state 385 wherein a determination is made whether all of the output block registers in the right half 100b are now full. If all of the block registers are not full, the process 350 moves to state 390 wherein the ACK_READY acknowledgment signal is asserted. This indicates that some of the data has been synchronized, but there is room for additional data in the right half 100b. The process 350 then returns to the decision state 360 wherein a determination is made whether the SYNC_DATA signal has been asserted.

If a determination was made at the decision state 385 that all of the block registers are full, the process 350 moves to state 395 wherein the ACK acknowledgment signal is asserted by the right half 100b. The process 350 then waits through one clock cycle at a state 400 before progressing to a decision state 405 wherein a determination is made whether all of the output block registers are still full. If the block registers are still full at the decision state 405, the process 350 progresses through an additional clock cycle at state 400 before returning to the decision state 405. If all of the block registers are not full at the decision state 405, the process 350 moves to a state 410 wherein the READY signal is asserted by the right half 100b. The process 350 then loops to the decision state 360 to determine whether the SYNC_DATA signal has been asserted.

Figure 8:
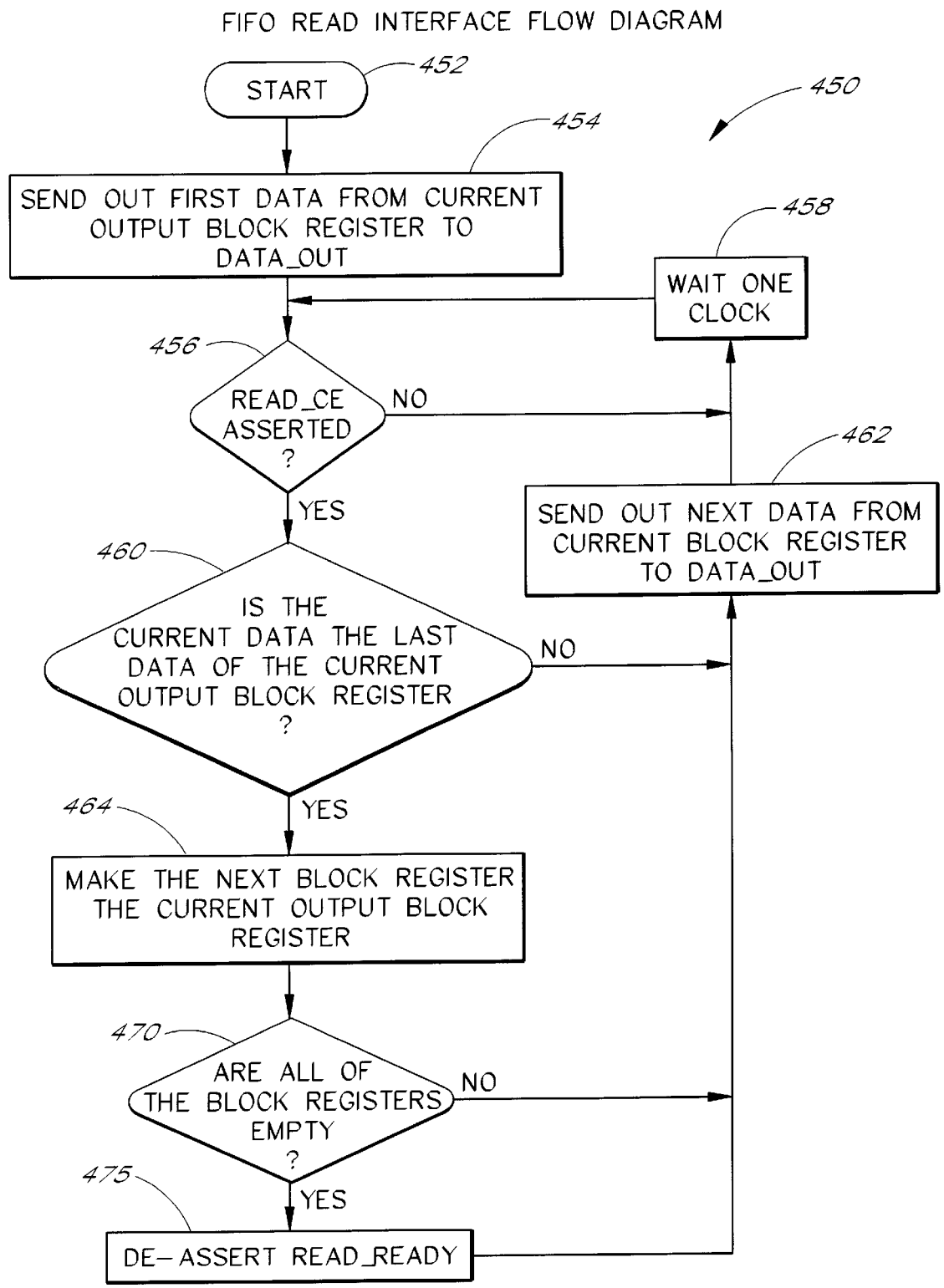
FIG. 8 is a flow diagram illustrating the signal changes that take place as data is written from an output block register in one embodiment of a bi-directional synchronizing FIFO buffer to an external device within a computer system.

Referring now to FIG. 8, a process 450 of outputting data that has been synchronized across a clock boundary is described. The process 450 begins at a start state 452 and then moves to state 454 wherein data from the currently selected output block register in the right half 100b is placed on the DATA_OUT line. The process 450 then moves to a decision state 456 wherein a determination is made whether the READ_CE signal has been asserted. As described in Table 1, the READ_CE signal is a clock enable signal that allows the data stored in the output block register to be read by the target component. If the READ_CE signal is not asserted at the decision state 456, the process 450 moves to state 458 wherein the process 450 waits through one clock cycle before returning to the decision state 456.

However, if a determination is made at the decision state 456 that the READ_CE clock enable signal has been asserted, the process 450 moves to a decision state 460 wherein a determination is made whether the current data in the output block register is the last data in the current output block register. If a determination is made that the current data in the current output block register is not the last data, the process 450 moves to a state 462 wherein the next block of data is sent out from the current output block register along the DATA_OUT line. The process 450 then waits through one clock cycle at state 458 before returning the decision state 456.

If a determination was made at the decision state 460 that the data in the current output block register was the last data, the process 450 moves to state 464 wherein a pointer is changed to select the next output block register for outputting data. The process 450 then moves to a decision state 470 wherein a determination is made whether all of the block registers are empty. If all of the block registers are not empty at the decision state 470, the process sends out the next data from the current block register at state 462. If a determination is made that all of the block registers are empty at the decision state 470, the process 450 moves to state 475 wherein the READ_READY signal is de-asserted to indicate that there is no longer data ready to be read from the output block register of the right half 100b.

It should be emphasized that the process outlined in FIGS. 5–8 could similarly be described for data that was input into the right half 100b and synchronized with the left half 100a of the bi-directional FIFO buffer 22. In addition, each of the processes listed in the FIGS. 5–8 can occur simultaneously. For example, data can be flowing into one of the input block registers in the left half 100a at the same time that data is flowing out of the right half 100b. In addition, data can be synchronized across the clock boundary from the left half 100a to the right half 100b at the same time that data is being either sent to, or read from, the bi-directional FIFO buffer 22.

Conclusion

The bi-directional FIFO buffer 22 transfers data from one clock domain to another very quickly by assembling the incoming data into data units prior to synchronization. By first assembling the data into units, fewer discreet packets of data are synchronized from one clock domain to the other. Since synchronizing data across clock boundaries can require several clock cycles, it is advantageous to send more data with every packet that crosses between clock domains.

In addition, the bi-directional FIFO buffer 22 provides an advantage by synchronizing the data blocks that cross between clock boundaries using control signals that are edge sensitive instead of relying on level sensitive signals. Thus, the control signals that cross the clock boundary from the left half 100a to the right half 100b (and vice versa) do not need to transition to a particular active logic level to indicate an event and then transition back to the inactive logic level, but simply signal an event by toggling from one logic level to another. In order to guarantee that each event is observed only once by the other FIFO half, an acknowledgment signal is sent before another event can be signaled.

In other systems that used level sensitive signals, the transition to an active level needed to be acknowledged as well as the transition to an inactive level. Because embodiments of this invention rely on edge sensitive signals, only a single acknowledgment of the edge transition is necessary, thus reducing the synchronization time for each event. Also, because the synchronized control signals guarantee that the data to be synchronized will meet the setup and hold time requirements at the inputs of the data block register, the data block may cross the clock boundary without additional logic gates and without causing metastability on the outputs of the data block registers.

The invention may be embodied in other specific forms without departing from its spirit or essential characteristics. The described embodiment is to be considered in all respects only as illustrative an not restrictive and the scope of the invention is, therefore, indicated by the appended claims rather than by the foregoing descriptions. All charges which come within the meaning and range of equivalency of the claims are to be embraced within their scope.

What is claimed is:

1. A method for buffering data transfers in a computer system from a first clock domain to a second clock domain using a buffer circuit having a first storage component under the control of a first clock and a second storage component under the control of a second clock, the method comprising the acts of:

converting a first plurality of units of data from a first component into a block of data, said first component being under the control of the first clock;

storing said block of data in the first storage component, wherein said first storage component is under the control of said first clock;

transferring said block of data from said first storage component to the second storage component in response to a signal;

converting said block of data into a second plurality of units of data; and transferring said second plurality of units of data to a second component, said second component being under the control of said second clock.

2. The method of claim 1, further comprising the act of:

transferring said second plurality of units of data to a second component under the control of said second clock.

3. The method of claim 1, wherein said act of storing said block of data to a first storage component comprises the act of storing said block of data to a register.

4. The method of claim 1, wherein said act of transferring said block of data to a second storage component comprises the act of transferring said block of data to a register.

5. The method of claim 1, wherein said act of converting said block of data into a second plurality of units of data comprises the act of demultiplexing said block of data.

6. The method of claim 1, wherein said act of converting said plurality of units of data from a first component into a block of data comprises the act of multiplexing said units of data.

7. The method of claim 1, wherein said method of buffering data transfers in a computer system comprises the act of buffering data transfers in a Pentium, Pentium Pro or Pentium II computer system.

8. In a computer system, a method for transferring data from a first clock domain to a second clock domain via a first block register under the control of the first clock and a second block register under the control of the second clock, the method comprising the acts of:

multiplexing a plurality of data units from a first component into a data block, said first component being under the control of a first clock;

storing said data block to a first block register, wherein said first block register is under the control of said first clock;

transferring said data block from said first block register to a second block register, wherein said second block register is under the control of a second clock; and demultiplexing said data block into a plurality of data units.

9. The method of claim 8, further comprising the act of:

transferring said plurality of data units to a second component under the control of said second clock.

10. The method of claim 8, wherein said method for transferring data comprises transferring data within in a Pentium, Pentium Pro or Pentium II computer system.

11. The method of claim 8, wherein said method for transferring data from a first clock domain to a second clock domain comprises transferring data from a 166 MHz clock domain to a 64 MHz clock domain.

* * * * *

UNITED STATES PATENT AND TRADEMARK OFFICE
CERTIFICATE OF CORRECTION

PATENT NO. : 6,029,253  
DATED : February 22, 2000  
INVENTOR(S) : Todd C. Houg

Page 1 of 1

It is certified that error appears in the above-identified patent and that said Letters Patent is hereby corrected as shown below:

Column 10,
Line 44, replace "additionai" with -- additional --.

Signed and Sealed this

Fourth Day of December, 2001

Attest:

*Nicholas P. Godici*

NICHOLAS P. GODICI
*Attesting Officer*    *Acting Director of the United States Patent and Trademark Office*